US012647339B2

(12) United States Patent
Cao et al.

(10) Patent No.: US 12,647,339 B2
(45) Date of Patent: Jun. 2, 2026

(54) DETERMINING A DELAY IN SIGNAL TRANSMISSION ALONG A WIRED TRANSMISSION MEDIUM

(71) Applicant: LitePoint Corporation, San Jose, CA (US)

(72) Inventors: Chen Cao, Shanghai (CN); Christian Volf Olgaard, Saratoga, CA (US); Ruizu Wang, San Jose, CA (US); Qingjie Lu, Shanghai (CN)

(73) Assignee: LitePoint Corporation, San Jose, CA (US)

( * ) Notice: Subject to any disclaimer, the term of this patent is extended or adjusted under 35 U.S.C. 154(b) by 295 days.

(21) Appl. No.: 18/216,799

(22) Filed: Jun. 30, 2023

(65) Prior Publication Data
US 2024/0430185 A1     Dec. 26, 2024

(30) Foreign Application Priority Data
Jun. 20, 2023     (CN) ......................... 202310741155.X

(51) Int. Cl.
*H04L 43/0852*          (2022.01)
(52) U.S. Cl.
CPC ................................ *H04L 43/0852* (2013.01)
(58) Field of Classification Search
None
See application file for complete search history.

(56) References Cited

U.S. PATENT DOCUMENTS

| | | | |
|---|---|---|---|
| 6,687,289 B1 | 2/2004 | Bohley | |
| 7,257,087 B2 * | 8/2007 | Grovenburg | ........ H04L 43/0864 |
| | | | 370/252 |
| 7,521,943 B2 * | 4/2009 | Binder | ................... G01R 27/04 |
| | | | 324/691 |

(Continued)

FOREIGN PATENT DOCUMENTS

| | | |
|---|---|---|
| JP | 3847788 | 11/2006 |
| KR | 20180074799 | 7/2018 |

(Continued)

OTHER PUBLICATIONS

International Search Report and Written Opinion in Application No. PCT/US2022/033723, mailed Sep. 30, 2022, (7 pages).

(Continued)

*Primary Examiner* — Melvin H Pollack
(74) *Attorney, Agent, or Firm* — ARENTFOX SCHIFF LLP

(57) ABSTRACT
An example system includes a signal generator to output signals based on multiple carrier frequencies; a wired transmission medium for carrying the signals, where the wired transmission medium is configured as open ended to produce reflections on the wired transmission medium of the signals; and a signal analyzer to receive the reflections and to determine a transmission time of a signal along the wired transmission medium based on the reflections. The signal analyzer is configured to perform operations that include performing a search based on an estimated transmission time of the signal along the wired transmission medium and the reflections to determine the transmission time. The search is to determine which of multiple candidate transmission times to select for the transmission time.

23 Claims, 4 Drawing Sheets

(56) References Cited

U.S. PATENT DOCUMENTS

| 8,537,972 | B2 * | 9/2013 | Thompson | H04L 43/50 |
| | | | | 379/10.01 |
| 8,829,916 | B2 * | 9/2014 | Defoort | H04M 3/085 |
| | | | | 324/527 |
| 9,000,989 | B2 | 4/2015 | Nickel et al. | |
| 9,035,672 | B2 | 5/2015 | Olgaard et al. | |
| 9,042,245 | B2 * | 5/2015 | Tzannes | H04L 43/10 |
| | | | | 370/252 |
| 9,341,543 | B2 * | 5/2016 | Viswanathan | G01M 11/3145 |
| 9,559,793 | B2 | 1/2017 | Meiyappan | |
| 9,854,558 | B2 * | 12/2017 | Richley | H04L 7/0331 |
| 9,953,196 | B2 * | 4/2018 | Turner | H04W 4/027 |
| 10,103,975 | B2 * | 10/2018 | Richley | H04B 1/06 |
| 10,345,418 | B2 | 7/2019 | Wadell et al. | |
| 10,564,219 | B2 | 2/2020 | Gohel et al. | |
| 10,609,762 | B2 * | 3/2020 | Hughes | H04W 84/18 |
| 10,624,038 | B2 * | 4/2020 | Lim | H04W 52/42 |
| 11,025,460 | B2 * | 6/2021 | Henry | H04W 16/18 |
| 11,069,082 | B1 * | 7/2021 | Ebrahimi Afrouzi | H04N 23/56 |
| 11,070,250 | B2 * | 7/2021 | Henry | H04B 3/06 |
| 11,093,518 | B1 * | 8/2021 | Lu | G06F 11/3476 |
| 11,277,159 | B2 * | 3/2022 | Kim | H01P 3/10 |
| 11,581,917 | B2 * | 2/2023 | Henry | H01P 5/103 |
| 11,592,913 | B2 * | 2/2023 | Regani | G06F 3/03545 |
| 11,598,803 | B1 | 3/2023 | Cao et al. | |
| 11,657,010 | B2 * | 5/2023 | Poulsen | G06F 13/423 |
| | | | | 710/314 |
| 11,828,816 | B2 * | 11/2023 | Esnault | H04M 1/72403 |
| 11,855,707 | B2 | 12/2023 | Cao et al. | |
| 12,047,818 | B2 * | 7/2024 | Otaka | H04W 36/0044 |
| 12,120,202 | B2 * | 10/2024 | Wang | E21B 43/26 |
| 12,386,015 | B2 * | 8/2025 | Agee | G01S 5/0205 |
| 12,399,501 | B2 * | 8/2025 | Ebrahimi Afrouzi | |
| | | | | G05D 1/0242 |
| 2005/0174131 | A1 | 8/2005 | Miller | |
| 2006/0224343 | A1 | 10/2006 | Visser et al. | |
| 2010/0164519 | A1 | 7/2010 | Sellathamby et al. | |
| 2011/0301905 | A1 | 12/2011 | Gregg et al. | |
| 2013/0197850 | A1 | 8/2013 | Yu et al. | |
| 2014/0103907 | A1 | 4/2014 | Muecke et al. | |
| 2014/0266930 | A1 | 9/2014 | Huynh | |
| 2015/0160264 | A1 | 6/2015 | Rada | |
| 2018/0048352 | A1 * | 2/2018 | Liu | H04L 41/0677 |
| 2022/0407610 | A1 | 12/2022 | Cao et al. | |
| 2023/0100135 | A1 * | 3/2023 | Liu | H04W 24/08 |
| | | | | 370/252 |
| 2023/0123322 | A1 * | 4/2023 | Cella | G06Q 10/067 |
| | | | | 700/29 |
| 2023/0155731 | A1 * | 5/2023 | Baldemair | H04L 1/0072 |
| | | | | 370/328 |
| 2024/0080814 | A1 * | 3/2024 | Eriksson | H04L 5/0053 |
| 2024/0098664 | A1 * | 3/2024 | Baldemair | H04W 56/0015 |

FOREIGN PATENT DOCUMENTS

| WO | 1997030360 | 8/1997 |
| WO | 2014058917 | 4/2014 |

OTHER PUBLICATIONS

International Search Report and Written Opinion in Application No. PCT/US2022/033726, mailed Oct. 13, 2022, (7 pages).

* cited by examiner

50

CONFIGURE TEST SYSTEM —50a

TRANSMIT DC SIGNAL OVER CABLE AT MULTIPLE CARRIER FREQUENCIES —50b

RECEIVE REFLECTED SIGNALS ("REFLECTIONS") FROM CABLE —50c

MEASURE REFLECTIONS —50d

PERFORM COARSE SEARCH USING CORRELATION —50e

PERFORM FINE SEARCH USING OPTMIZATION —50f

DETERMINE TRANSMISSION TIME —50g

PERFORM CALIBRATION BASED ON TRANSMISSION TIME —50h

DETERMINING A DELAY IN SIGNAL TRANSMISSION ALONG A WIRED TRANSMISSION MEDIUM

CROSS-REFERENCE TO RELATED APPLICATION

This application claims priority to Chinese patent application no. 202310741155.X, which was filed on Jun. 20, 2023. The contents of Chinese patent application no. 202310741155.X are incorporated herein by reference.

TECHNICAL FIELD

This specification describes example implementations of test systems configured to determining a delay in signal transmission along a wired transmission medium.

BACKGROUND

A test system is configured to test the operation of a device. A device tested by the test system is referred to as a device under test (DUT). The test system may include test instruments to send test signals, such as radio frequency (RF) signals, and data over a wired transmission medium, such as a cable, to the DUT for testing. The DUT replies with response signals. The test system expects the response signals to contain certain values and/or to have a certain timing. If the response signals have the appropriate values and/or timing, the DUT passes testing. If the response signals do not have those values and/or timing, then the DUT may fail testing.

A wired transmission medium, such as a cable, introduces delay into the test system. For example, it takes time for the test signals and response signals to propagate along the cable. This time, also called the time-of-flight (TOF), is an example of delay introduced by the cable during signal transmission. The delay may have an adverse affect on testing. For example, when testing timing on the DUT, the delay in signal transmission associated with the cable will affect the results.

Ultra wide band (UWB) technology measures time between two devices and translates that to distance. To get the most accurate distance, the delay of the cable between the test system and the DUT should be equal to a reported time/distance. Thus, it may be important to know the actual delay of the cable. The same is true for over-the-air (OTA) measurements, where an antenna radiates a test signal to the DUT and the DUT replies. In some cases, the measured distance between antenna and DUT must be compensated by the additional delay between tester and antenna.

Accordingly, techniques have been implemented to determine the delay in signal transmission and to factor-in this delay into the testing process, e.g., to calibrate the test system based on the delay. Example techniques for determining the delay in signal transmission include incorporating transmission and measurement equipment at different ends of the cable. The measurement equipment measures the transmission time based on the time that the transmission equipment transmitted the signal. Techniques such as these may require specialized equipment that must be set-up and then taken-down, making them labor intensive, particularly when there are large numbers of ports to connect to the DUT. As such, for some types of DUTs, techniques such as these may be challenging to implement in some testing contexts.

SUMMARY

An example system includes a signal generator to output signals based on multiple carrier frequencies; a wired transmission medium for carrying the signals, where the wired transmission medium is configured as open ended to produce reflections on the wired transmission medium of the signals; and a signal analyzer to receive the reflections and to determine a transmission time of a signal along the wired transmission medium based on the reflections. The signal analyzer is configured to perform operations that include performing a search based on an estimated transmission time of the signal along the wired transmission medium and the reflections to determine the transmission time. The search is to determine which of multiple candidate transmission times to select for the transmission time. The multiple candidate transmission times vary by multiples of a step size. The example system may include one or more of the following features, either alone or in combination.

The operations may include performing a coarse search based on the reflections to determine the estimated transmission time. The coarse search may be performed to determine which of multiple candidate transmission times to select for the estimated transmission time. The multiple candidate transmission times used in the coarse search may vary by multiples of a first step size. The search based on an estimated transmission time may include a fine search. The step size in the fine search may be a second step size. The first step size may be greater than the second step size. The multiple candidate transmission times used in the coarse search may include first candidate transmission times and the multiple candidate transmission times used in the fine search may include second candidate transmission times.

The coarse search may be insensitive to magnitude and phase offsets of signals having the first candidate transmission times. The coarse search may include identifying a maximum correlation based on (i) the first candidate transmission times and (ii) a sum of reflections along the wired transmission medium, reflections at an open end of the wired transmission medium, and noise, The maximum correlation may correspond to the estimated transmission time. The fine search may be sensitive to magnitude and phase offsets of signals having the second candidate transmission times. At least two of the multiple carrier frequencies may be orthogonal.

The fine search may include determining the transmission time within a predetermined range of the estimated transmission time based on differences between (i) values that are based on the reflections and (ii) values that based on second candidate transmission times. Determining the transmission time may include identifying one of the values that based on one of the second candidate transmission times that minimizes the difference. The predetermined range may be within a range of 200 picoseconds or more.

The values based on the reflections may be based on magnitudes and phases of the reflections. The values based on of the second candidate transmission times may be based on magnitudes and phases of signals having different transmission times. The different transmission times may vary by single digit picoseconds.

The signal generator and the signal analyzer may be part of a single hardware device connected to the wired transmission medium. The single hardware device may be or include a tester or test system. The tester or test system may include one or more processing devices programmed to perform the search. The multiple carrier frequencies may be upconverted based on a direct current (DC) signal. The multiple carrier frequencies may be carrier wave signals not subjected to upconversion.

An example method includes the following operations: outputting signals on a wired transmission medium based on multiple carrier frequencies, where the wired transmission medium is configured as open ended to produce reflections on the wired transmission medium of the signals; and determining a transmission time of a signal along the wired transmission medium based on the reflections. Determining the transmission time includes performing a search based on an estimated transmission time of the signal along the wired transmission medium and the reflections to determine the transmission time. The search is performed to determine which of multiple candidate transmission times to select for the transmission time. The multiple candidate transmission times vary by multiples of a step size. The example method may include one or more of the following features, either alone or in combination.

Determining the transmission time may include performing a coarse search based on the reflections to determine the estimated transmission time. The coarse search may be performed to determine which of multiple candidate transmission times to select for the estimated transmission time. The multiple candidate transmission times used in the coarse search may vary by multiples of a first step size. The search based on an estimated transmission time may include a fine search. The step size in the fine search may be a second step size. The first step size may be greater than the second step size. The multiple candidate transmission times used in the coarse search may include first candidate transmission times and the multiple candidate transmission times used in the fine search may include second candidate transmission times.

The coarse search may be insensitive to magnitude and phase offsets of signals having the first candidate transmission times. The coarse search may include identifying a maximum correlation based on (i) the first candidate transmission times and (ii) a sum of reflections along the wired transmission medium, reflections at an open end of the wired transmission medium, and noise. The maximum correlation may correspond to the estimated transmission time.

The fine search may be sensitive to magnitude and phase offsets of signals having the second candidate transmission times. At least two of the multiple carrier frequencies may be orthogonal.

The fine search may include determining the transmission time within a predetermined range of the estimated transmission time based on differences between (i) values that are based on the reflections and (ii) values that based on second candidate transmission times. Determining the transmission time may include identifying one of the values that is based on one of the second candidate transmission times that minimizes the difference. The predetermined range may be within a range of 200 picoseconds or more.

The values based on the reflections may be based on magnitudes and phases of the reflections. The values based on the second candidate transmission times may be based on magnitudes and phases of signals having different transmission times. The different transmission times may vary by single digit picoseconds. The multiple carrier frequencies may be upconverted based on a direct current (DC) signal. The multiple carrier frequencies may be carrier wave signals not subjected to upconversion.

Any two or more of the features described in this specification, including in this summary section, may be combined to form implementations not specifically described in this specification.

At least part of the devices, systems, techniques, and processes described in this specification may be configured or controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the devices, systems, techniques, and processes described in this specification may be configured or controlled using a computing system comprised of one or more processing devices and memory storing instructions that are executable by the one or more processing devices to perform various control operations. The devices, systems, techniques, and processes described in this specification may be configured, for example, through design, construction, composition, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Described herein are example implementations of processes for determining a delay in signal transmission associated with a wired transmission medium, such as a cable, and example systems configured to implement those processes,. An example process includes connecting a signal transceiver to one end of a cable and leaving the other end of the cable open-ended; for example, not connected to device under test (DUT). The "cable" in this example may include any fixtures, such as connectors or the like, that connect the cable to the signal transceiver and that would connect to a DUT.

The signal transceiver outputs signals to the cable over multiple carrier frequencies. Each signal output to the cable may be a carrier wave signal. The examples presented below describe a carrier wave signal having a selected carrier frequency upconverted using a DC signal, which is referred to herein as a DC-upconverted signal. However, other types of carrier wave signals be used, including signals having different frequencies which are generated to have different amplitudes without being subjected to DC-upconversion. DC signals are used since they do not introduce additional complexities, such as additional phases. Upconversion, in some examples, includes changing an amplitude of the carrier wave signal by multiplying the carrier wave signal by the DC signal—essentially, amplitude modulation of the carrier wave signal using the DC signal. In some examples at least two of the carrier wave signals have different frequencies that are orthogonal.

DC-upconverted signals transmitted over the cable reflect from the open-end of the cable back to the signal transceiver. DC-upconverted signals transmitted over the cable also may reflect from mismatches or abnormalities along the path of the cable. The mismatches or abnormalities may include, for example, impedance mismatches, structural abnormalities in the cable, and/or connectors along the cable, for example.

Figure 1:
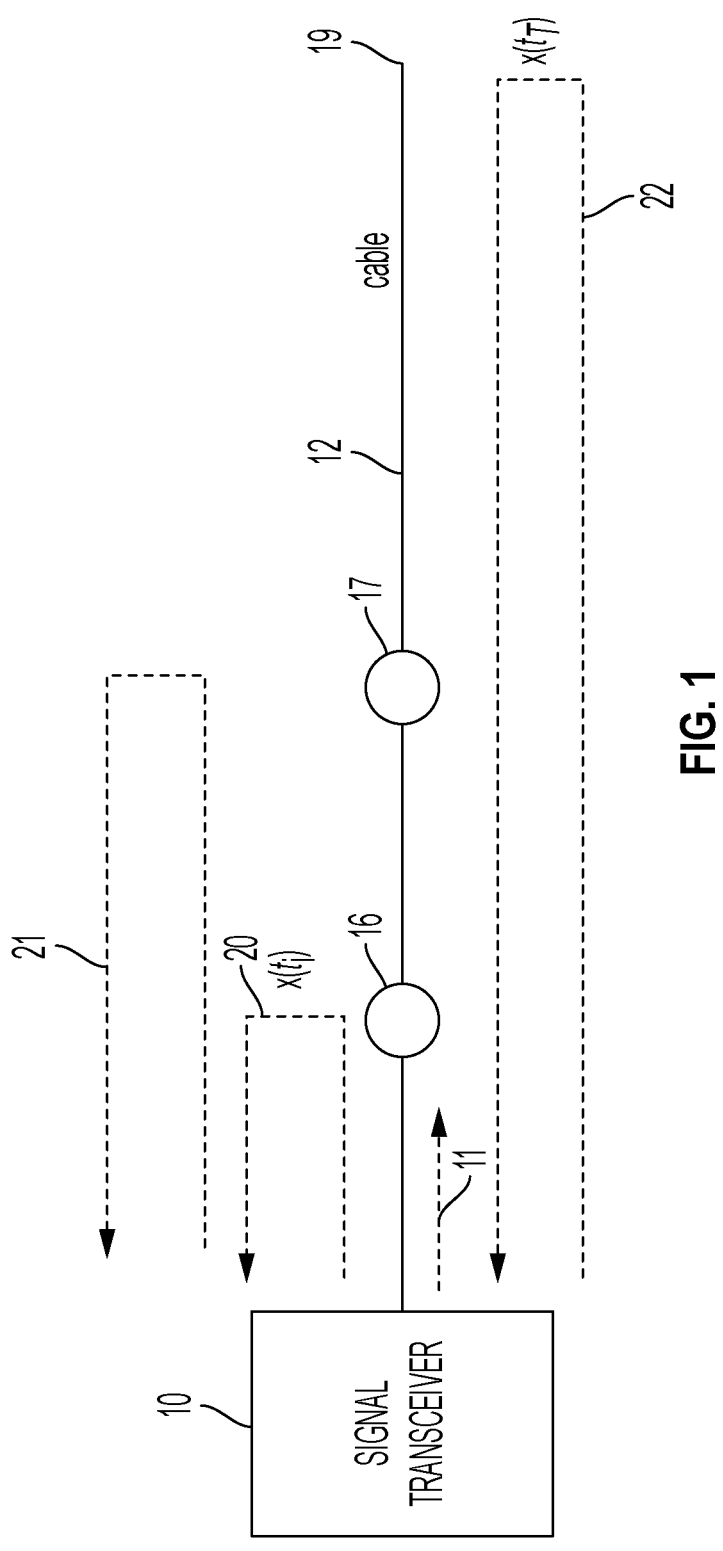
FIG. 1 is a block diagram showing example signal reflections along a wired transmission medium having an open end.

Examples of these reflections are shown in FIG. 1. More specifically, in FIG. 1 signal transceiver 10 outputs DC-upconverted signals 11 to cable 12. The cable has mismatches 16, 17 and open-end 19. Reflections 20, 21, and 22 of the DC-upconverted signals occur at mismatches 16, 17 and open end 19, respectively. Although three reflections are shown, there may be tens or hundreds more in some examples. Signal transceiver 10 receives these reflections and organizes them as a vector/array, with each element thereof being for an individual different carrier frequency.

The example processes include performing a coarse search based on the reflections to determine an estimated transmission time, $t_{T(coarse)}$, of signals across cable 12. In this example, the coarse search determines which of multiple candidate transmission times to select for the estimated transmission time based on a correlation to the elements in the vector/array. The candidate transmission times vary by multiples of a predefined step size, which in examples of the coarse search may be tens or hundreds of picoseconds (ps) or more or less. The candidate transmission time that has the highest correlation to an element of the vector/array is deemed the estimated transmission time, $t_{T(coarse)}$, of signals across the entire length of cable 12 determined by the coarse search, and is used in a subsequent, or fine, search operation to further refine the transmission time, $t_T$, across the entire length of cable 12.

The fine search may be performed within a range of the estimated transmission time, $t_{T(coarse)}$. For example, the range, defined by values "d" in this example, may be selected based on the carrier frequencies and the cable length. Examples of d may be, but are not limited to, 200 ps, 300 ps, 400 ps, and so forth up to 800 ps or more or less in some cases. The fine search performs an optimization to determine which of multiple candidate transmission times within the range of $t_{T(coarse)}$−d to $t_{T(coarse)}$+d to select for the transmission time, $t_T$, of signals along the cable. The candidate transmission times in the fine search are different from those used in the coarse search and vary by multiples of a predefined step size. In the fine search phase, the predefined step size may be single-digit picoseconds such as 10 ps or less, or tens of picosecond or less such as 100 ps or less, or less or more in some examples.

The optimization performed in the fine search is sensitive to signal phase and offset of the signal phases, which is not necessarily the case in correlation performed in the coarse search. In this example, the offset indicates that the phases of the reflections are not the same which may be due, for example, to different points of reflection along the cable. As a result, the fine search may enable a more precise determination of transmission time than the coarse search. In some implementations, the fine search may be performed independently of the coarse search by using a range determined based on test setup and attributes of the cable such as, but not limited to, the cable length, the composition of the cable, and the geometry of the cable.

Figure 2:
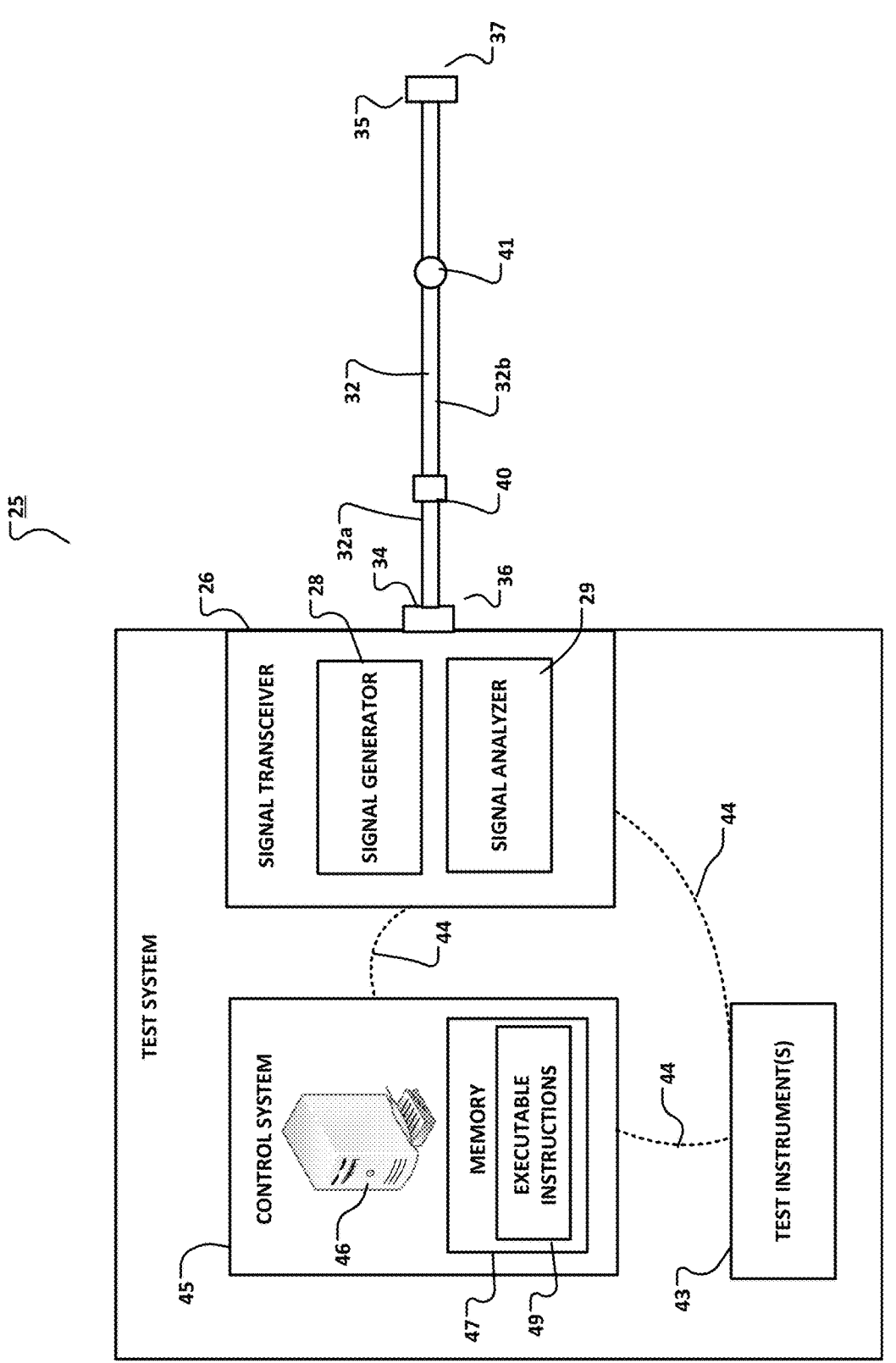
FIG. 2 is a block diagram of components of an example test system containing a wired transmission medium having an open end.

FIG. 2 is a block diagram showing a configuration of components of an example test system 25 configured to implement the example processes described herein.

Test system 25 includes one or more test instruments 43. The test instruments may be hardware devices that may include one or more processing devices and/or other processing circuitry (not shown). The test instruments may be configured—for example, programmed—to output, via signal transceiver 26, test signals to test DUTs (not shown) connected to a wired transmission medium, such as cable 32. The test signals to test the DUTs may be or include instructions, commands, data, parameters, variables, test patterns, and/or any other information designed to elicit response(s) from the DUT. One or more—for example, all of—the test instruments may be configured to receive, from the DUT (via signal transceiver 26), responses to the test signals sent from the test instruments to the DUT. The test instruments may be configured to analyze the responses to determine whether a DUT passed for failed testing. For example, the timing of the responses may be analyzed, the data represented by the responses may be analyzed, and the like. The test instruments may include, but are not limited to, radio frequency (RF) instruments to test RF signals, digital test instruments to test digital signals, analog test instruments that may include pin electronics and/or parametric measurement units (PMUs), and so forth.

Test system 25 includes a control system 45. The control system may be or include a computing system comprised of one or more processing devices 46 (e.g., microprocessor(s)) and memory 47 for storage. In an example, control system 45 may be configured to execute the instructions (e.g., computer code) 49 stored in memory 47 to control test instruments 43 to perform testing on the DUTs, e.g., to send the test instruments test programs to execute to generate the test signals, or to send the test signals to the test instrument(s) to process and/or forward to the DUTs. Control system 45 also may be configured to execute the instructions to control signal transceiver 26 described below and/or to perform all or part of the coarse search process and fine search process described with respect to FIG. 3. Dashed lines 44 indicate wired or wireless connections among the components depicted in FIG. 2, over which analog, digital, and/or RF communications between the components may pass.

Signal transceiver 26 includes a signal generator 28 and a signal analyzer 29 or the functionality of each of these components in a one, two, or more hardware devices. In some implementations, signal generator 28 is configured to operate as a carrier wave signal generator and, in this capacity, is configured to generate and to output delay test signals used to test a delay along a wired transmission medium, such as cable 32. The form and timing of the delay test signals may be dictated by (e.g., instructed, set and/or controlled by) control system 45 and/or by one or more the test instrument(s) 43. In this example, the delay test signals are DC-upconverted signals. The DC-upconverted signals are used in the following examples; however alternating current (AC) signal(s), complex signals, or other types of signals may be used as the delay test signals.

Signal generator 28 is configured to generate multiple carrier frequencies to produce DC-upconverted signals based on one or more DC signals. The DC signals used to produce the DC-upconverted signals may be provided to, or produced by, signal generator 28. The number of carrier frequencies and the actual frequencies used may be dictated by control system 45 and/or by one or more the test instrument(s) 43. The carrier frequencies may be in a range such as, but not limited to, 4 Gigahertz (GHz) to 12 GHz or, in some examples, greater than 12 GHz. In some examples, there may be tens or hundreds of carrier frequencies upconverted by (e.g., based on) the DC signal, and these carrier frequencies may differ by, e.g., be incremented at, regular intervals. In a non-limiting example, the carrier frequencies may start at 4 GHz incrementing by 0.1 GHz to 6 GHz. In another non-limiting example, the carrier frequencies may start at 5 GHz incrementing by 0.01 GHz to 9 GHz. Any appropriate increments and/or range of frequencies may be used; not just those listed here.

Test system 25 also includes a wired transmission medium 32 such as, but not limited to, a cable (e.g., a coaxial cable), a transmission line, and/or any other type of electrical conductor. The following example describes use of cable 32 as the wired transmission medium. The cable, in this example, may include a fixture 34, 35, such as a connector, at each respective end 36, 37 of the cable. The processes described herein account for the presence of, and delays caused by, these fixtures in some implementations. Accordingly, in some implementations, references to the cable and/or wired transmission medium include any electrically conductive medium over which signals are transmitted together with fixtures at ends or along the length thereof.

As explained previously, in test system 25 cable 32 is open-ended. For example, one end 35/37 of cable 32 is not connected to a DUT or other device to receive signals from the cable. However, in some examples, an RF probe (not shown) may connect to end 35 of cable 32. The RF probe may monitor signals on the cable. The cable may include multiple sections. For example, as shown in FIG. 2, cable 32 may include individual cables such as cables 32a, 32b, which are connected via connector 40. Connector 40 may create an impedance mismatch that causes reflections (see, e.g., FIG. 1). Cable 32 may also include one or more abnormalities 41, which may be caused by manufacturing defects or damages, which result in impedance mismatch(es) along a length of the cable, and which may cause reflections (see, e.g., FIG. 1).

Signal generator 28 is configured to output, to cable 32, DC-upconverted signals such as signals 11 of FIG. 1 that are generated based on multiple different carrier frequencies. Because multiple DC-upconverted signal are output, the result is multiple reflections on the cable—e.g., one or more reflections for each DC-upconverted signal. In the example of FIG. 2, DC-upconverted signals based on various carrier frequencies reflect from open end 35/37 of cable 32, from the abnormalities 41, and from the impedance mismatches 40. These reflections are directed back along the cable to signal transceiver 26. The reflections are out of phase of each other and travel along different lengths of the cable, as described with respect to FIG. 1. This is due, at least in part, to the use of different frequencies, to the reflections not occurring at the same place along the cable, and to the reflections not occurring at regular, or known, intervals that correspond to phases of the DC-upconverted signals.

Signal analyzer 29 is configured to receive the reflections of the DC-upconverted signals and to measure the reflections. Referring to FIG. 1, the measured reflections include $x(t_i)$. For example, the signal analyzer measures a value of a reflected signal x at each time $t_i$. In some implementations, signal analyzer 29 may be configured to determine a transmission time, $t_T$, of a DC-upconverted signal between open end 37 and transceiver 26 based on the reflections using process 50 described below. Referring to FIGS. 1 and 2, $t_T$ is the time-of-flight of a signal from open end 19, 35/37 back to signal transceiver 26, that is, the time along the entire length of the cable.

Figure 3:
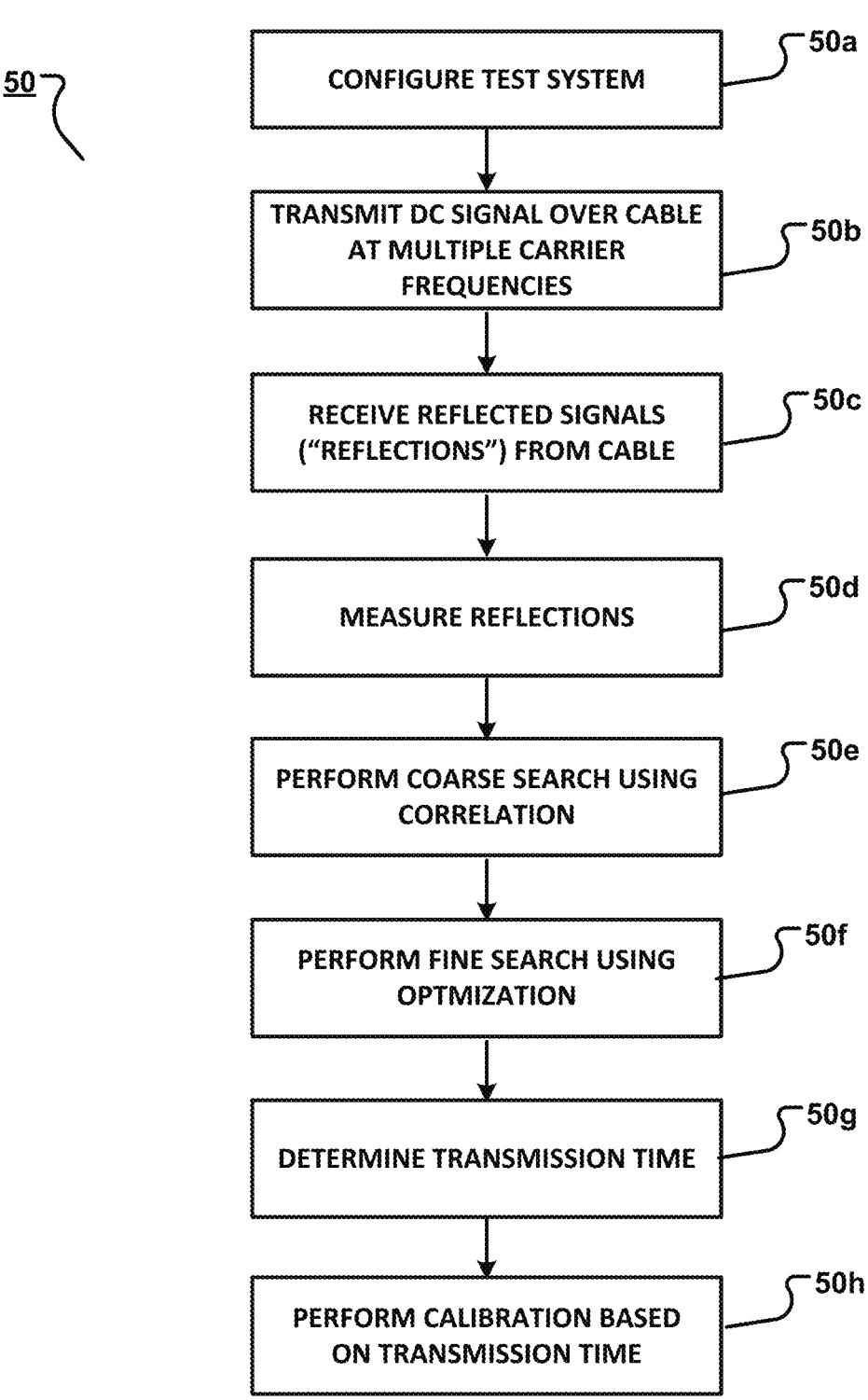
FIG. 3 is a block of operations included in an example process for determining a delay in signal transmission along a wired transmission medium having an open end.

In some implementations, signal analyzer 29 may include one or more processing devices and/or circuitry configured to determine the transmission time, $t_T$, of a DC-upconverted signal along the entire length of the cable based on the reflections using process 50 of FIG. 3. In some implementations, signal analyzer 29 may be configured to provide its measurements to control system 45 and control system 45 may be configured to determine the transmission time, $t_T$, of the DC-upconverted signal along the entire length of the cable based on the reflections using process 50 of FIG. 3. In some implementations, signal analyzer 29 may be configured to provide its measurements to one or more of test instrument(s) 43 and test instrument(s) 43 may be configured to determine the transmission time, $t_T$, of the DC signal along the entire length of the cable based on the reflections using process 50 of FIG. 3. In some implementations, signal analyzer 29, test instrument(s), and/or control system 45 may be configured to operate together to determine the transmission time, $t_T$, of the DC-upconverted signal along the entire length of the cable based on the reflections using process 50 of FIG. 3.

Referring to FIG. 3, process 50 includes configuring (50a) the test system to determine a delay (e.g., a time-of flight | "TOF") in signal transmission along a cable 32. In this example, the configuration operations may include disconnecting a DUT or other device from fixture 35, leaving end 37 of cable 32 open-ended, while still keeping cable 32 connected to test system 25 via fixture 34.

The signal generator 28 transmits (50b), to cable 32 having open end 37, multiple different DC-upconverted signals (or other signals such as carrier wave signals, AC signals, complex signals, and so forth as the delay test signals). As noted, signal generator 28 may be controlled to output DC-upconverted signals by control system 45 and/or test instruments 32. For example, the DC signal value or values and the selection of which carrier frequencies to use to generate the multiple DC-upconverted signals may be made by control system 45 and/or test instruments 32 based on programming in those components and/or user input. For example, in some implementations, the multiple DC-upconverted signals may be based on (e.g., formed using) a single DC value and multiple different carrier frequencies. For example, in some implementations, the multiple DC-upconverted signals may be based on (e.g., formed using) multiple different DC values and multiple different carrier frequencies.

The DC-upconverted signals reflect from the cable open end 37 and from various points along the cable, as described with respect to FIG. 1, for example. Signal analyzer 29 receives (50c) the reflected signals from cable 32; that is, the signal analyzer receives the reflections of the DC-upconverted signals. Signal analyzer 29 measures (50d) the reflected signals (i.e., the reflections). For example, signal analyzer 29 measures the magnitude and phase of a reflection "x" as a function of time "$t_i$", where the subscript "i" in this example corresponds to the different travel times.

In some implementations, signal analyzer 29 measures (50d) a signal y that is based on the combined reflections. The signal y, in this example, is a vector/array containing a signal $y_{fn}$ at each measured frequency: $y=[y_{f1}, y_{f2}, \ldots]$, where "fn" is the frequency. The individual elements of y (e.g., $y_{f1}$ etc.) are the sum of $x(t_i)$, $x(t_T)$, and noise n. $x(t_i)$ is a vector defined as follows: $x(t_i)=[(x(t_i), f_1), (x(t_i), f_2) \ldots]$, where $x(t_i)$ is a measurement of the reflection from the signal path having travel time $t_i$, and frequency f, and where $x(t_i) \in C^K$. The measurement of $x(t_i)$ may include the amplitude, frequency, phase, and timing (e.g., receipt time) of each $x(t_i)$. $x(t_T)$ is the reflection from cable open end 37 (for example, the reflection from the entire length of cable 32) that is the value being searched for in y. $x(t_T)$ is a reflection like an element of $x(t_i)$. n is random noise in a corresponding reflection, where $n \in C^K$. In some examples, only the signal y is actually measurable by signal analyzer 29; its components, namely, $x(t_i)$, $x(t_T)$, and noise n, are not measurable individually by the signal analyzer.

Process 50 performs (50e) a coarse search process based on y to determine $x(t_{T(coarse)})$, where $x(t_{T(coarse)})$ is an estimate of the delay in signal transmission along the entire length of cable 32 obtained using the coarse search process. The coarse search process determines, for the measured value of y, what is the best guess for the $t_{T(coarse)}$ value. More specifically, the coarse search process tests different candidate values of $t_i$ using estimated $x(t_T)$ values at various steps or increments in order to determine which estimated value of $t_T$ matches a value of y most closely, e.g., where y contains $x(t_T)$ as explained above and as shown in equation (1) below. The estimated value of $t_T$ that matches a value of y most closely constitutes an estimated delay in signal transmission ($t_{T(coarse)}$) along the entire length of cable 32, which may be further refined using the fine search process described below.

In more detail, the signal analyzer receives reflections (i.e., reflected versions of the DC-upconverted signals/delay test signals) that define the vector y, which includes a signal x having a target traveling time $t_T$, and which is defined as follows.

$$y = a_T \cdot x(t_T) + \sum_i a_i \cdot x(t_i) + n \qquad (1)$$

where:
  $x(t_i)$ are measurements of reflections along the cable, which may occur at various points,
  $x(t_T)$ is the reflection from the cable open end 37 and is the value to be determined,
  $a_i$ is a magnitude of a reflection $x(t_i)$, where $a_T$ is the magnitude of the reflection $x(t_T)$ from the open end 37 of the cable, where $a_i \in R^K$ and is a real number, and
  n is a vector containing random noise in each respective signal reflection, where $n \in C^K$.

By assuming that the magnitude response $\|a_t\|^2$ of the target traveling time $t_T$ is the largest, the coarse search process employs the correlation process of equation (2) to find t* for the maximum correlation of $$\underset{t^*}{\mathrm{argmax}} \|x^H(t^*)y\|^2 \qquad (2)$$

More specifically, the correlation process of equation (2) selects different candidates, namely t*, for $t_T$ by selecting different candidates for $x(t_T)$, namely x(t*), in order to identify which of those candidates for $x(t_T)$ has a maximum correlation to a value in the vector y. The different candidate times used in the correlation process may vary by multiples of a step size. For example, the candidates for $t_T$, namely t*, may correspond to x(t*) varied incrementally by step sizes ("step_size") of, for example, tens or hundreds of picoseconds (ps) or more or less along a continuum between two frequencies, e.g., in the range of 4 GHZ to 12 GHz, between a start value for x(t*), through $x(t^{*+step\_size})$, $x(t^{*+step\_size\times2})$, $x(t^{*+step\_size\times3})$, and so forth to an end value $x(t^{*+step\_size\times(n)(where\ n>3)})$, where "x" in the superscript means "multiplied by". The start value, end value, and step sizes may be based on the DUTs to be tested, the frequencies used for testing, the length of the cable, and/or other factors. Selecting the step size may be a trade-off between the resolution obtained (limited by noise) and the time required for processing. Smaller steps will result in more processing time. Steps that are too small could be limited by noise and other minor impairments, which could be filtered-out in some implementations.

Figure 4:
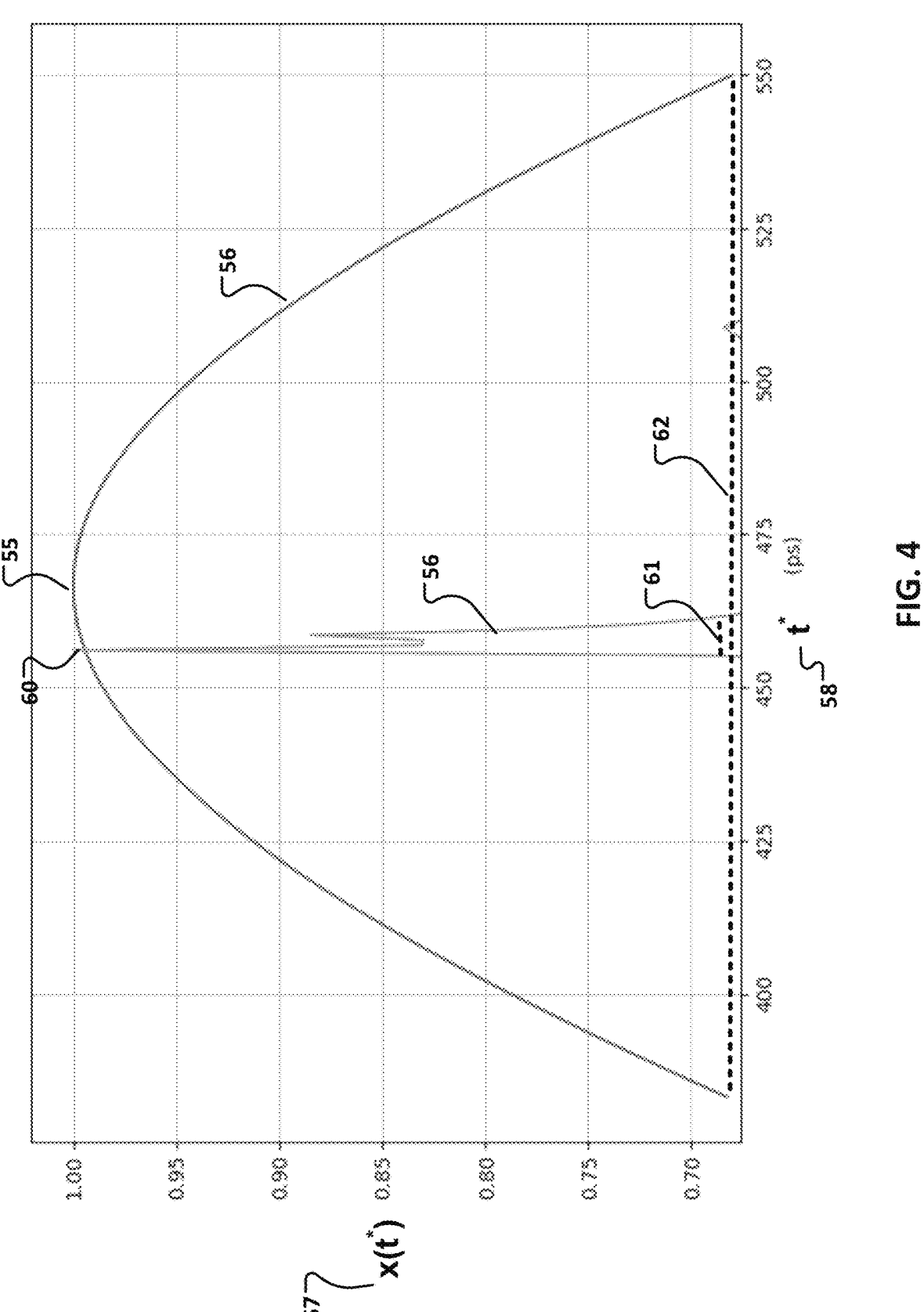
FIG. 4 is an example of a graph showing example delays in signal transmission along a wired transmission medium determined using different processes.

FIG. 4 shows an example graph showing example correlations 56 obtained using equation (2) for different values of x(t) 57 over time t* 58 in picoseconds. As shown, in this example, the maximum correlation occurs at a value 55 of t* of about 460 ps. Value 55 may be used as the estimate ($t_{T(coarse)}$) obtained by the coarse search process in the fine search process 50 performed by process 50. More specifically, as explained above, the fine search process 50 performs an optimization to determine which of multiple candidate transmission times within the range of $t_{T(coarse)}-d$ to $t_{T(coarse)}+d$ to select for the transmission time along cable 32. The candidate transmission times used in the fine search process may vary by, but are not limited to, multiples of step sizes of, single-digit picoseconds or double-digit picoseconds, or more in some examples. In the fine search phase, an example predefined step size may be, but is not limited to, single-digit picoseconds, such as 10 ps or less in some examples.

The correlation of equation (2) is insensitive to phase offset (i.e., $e^{j\theta}x(t_T)$), where $\theta$ is the phase of $x(t_{T(coarse)})$, and magnitude $a_T$. Consequently, the correlation of equation (2) may be prone to reflection traveling path interference because different reflected signals (i.e., reflections) along cable 32 are not correlated. This means that the maximum correlation at value 55 (FIG. 4) determined by equation (2) may be influenced by an interference pattern that is not at the target point: $t^* \neq t_T$, which can lead to an error in $t_{T(coarse)}$. That is, the maximum correlation, due to the interference pattern, may present at a location that is not the best estimate 55 of $t_T$. The fine search (50f) performed by process 50 is sensitive to phase offset and magnitude response in this example. This sensitivity may provide for better resolution of $t_T$ relative to the coarse search process and reduce the effects of the interference pattern introduced by the reflections on the estimate of $t_{T(coarse)}$.

The fine search process (50f), also referred to herein as the nullspace process, uses some of the same nomenclature and variables as the coarse search process. Accordingly, that nomenclature and variables are not explained again here. The fine search process searches for a vector a*·x(t*), such that the projection of vector y−a*·x(t*) into the vector space $S_t$* is minimized. The vector space $S_t$ includes a space spanning a travel time t along the entire length of cable 32 with all possible magnitude responses, e.g., $\{a_m \cdot x(t^*)\}$, where "m" is an integer greater than one. The following explains how the optimization used in performing the fine search is determined.

Listing all possible magnitude responses for reflections "x" as $a_m$ where m=1, 2, . . . , produces the following vector set:

$$X_t = [a_1 \cdot x(t), a_2 \cdot x(t), \dots]$$

An eigenvalue decomposition produces the following:

$$X_t^H X_T = Q_t A_t Q_t^H$$

where the eigenvalues $\lambda$ matrix is defined as follows:

$$A = \begin{pmatrix} \lambda_1 & & \\ & \lambda_2 & \\ & & ... \end{pmatrix}$$

and where the eigenvalues q matrix is defined as follows:

$$Q = [q_1, q_2, ... ]$$

The first L (L>1) largest eigenvalues corresponding to eigenvectors are retained to construct the vector space $S_t$, and the remaining eigenvalues are abandoned because they are so small that they have next to no effect on the vector space $S_t$.

$$S_t = \text{span } \{q_1, q_2, ... q_L\}$$

When listing all possible magnitude responses to construct $S_t$, the magnitude offset used has little or no impact on $S_t$ because any offset will only contribute into eigenvalues. The eigenvectors and the space $S_t$ will stay the same. So when listing all possible magnitude responses, only the "shape" of frequency relative to the magnitude matters.

The optimization shown in equation (3) below is used to vary t* to identify a maximum value of the optimization. The value of t* at that maximum value is determined (50g) to be $t_T$; that is, the delay along the entire length of cable 32. This is done by varying a*·x(t*) for different values of t*. Accordingly in this fine searching process, both a and x(t*) are searched. The value of a*·x(t*) that produces the maximum value of equation (3) corresponds the value of t (the delay along cable 32) that minimizes the difference between y and a*·x(t*).

$$\underset{a^*,t^*}{\text{argmax}} \frac{1}{(y - a^* \cdot x(t^*))^H S_t S_t^H (y - a^* \cdot x(t^*))} \quad (3)$$

The different times for t* (the candidates for $t_T$) used in equation (3) may vary by multiples of a step size. For example, different times for t* may correspond to a*·x(t*) varied incrementally by step sizes ("step_size") of, for example, tens of picoseconds (ps), single digit picoseconds or less or more along a continuum between two frequencies, e.g., in the range of 4 GHz to 12 GHz, between a start value for a*·x(t*), through a*·x(t*$^{+step\_size}$), a*·x(t*$^{+step\_size \times 2}$), a*·x(t*$^{+step\_size \times 3}$), and so forth to an end value a*·x(t*$^{+step\_size \times (n)(where~n>3)}$), where "x" in the superscript means "multiplied by". In some examples, the start value and end value may be a*·x($t_{T(coarse)}$−d) and a*·x($t_{T(coarse)}$+d), respectively, where $t_{T(coarse)}$−d and $t_{T(coarse)}$+d were times determined using the coarse search process 50. In some examples, the start value and end value may be programmed into the test system beforehand and may not be based on the coarse search process (e.g., in cases the coarse search process is not performed). The step sizes may be based on the DUTs to be tested, the frequencies used for testing, the length of the cable, and/or other factors.

The search performed using the optimization equation (3) is sensitive to magnitude and phase offset of the reflections.

To show this, assume that signal analyzer 29 receives a signal y containing a target signal a·x. When performing the optimization of equation (3) using a random phase or magnitude offset, the target signal would not be fully removed after the subtraction y−a*·x(t*), e.g., a* and x in the candidate a*·x(t*) are not equal to the actual values of a* and x inherent in y. The remaining signal will not be orthogonal to the subspace $S_t$, which leads to a lower value produced by equation (3). When performing the optimization of equation (3) using the exact phase and magnitude offset, x and a* respectively, the target signal will be fully removed after the subtraction y−a*·x(t*). The projection of the remaining signal to $S_t$ will be minimized, which leads to a maximum value in equation (3).

FIG. 4 contains an example curve showing optimizations 56 obtained across $t_{T(coarse)}$−d and $t_{T(coarse)}$+d using equation (3) for different values of a*·x(t*). As shown, in this example, the maximum value of the optimizations occurs at a value 60 of about 456.5 ps, which is determined to be $t_T$, that is, the delay along the entire length of cable 32, and which is different from $t_{T(coarse)}$. Likewise, because the interference effects are reduced, the envelope 61 produced using the fine search process is smaller—for example, shorter in duration—than the envelope 62 produced using the coarse search process.

Referring back to FIG. 3, process 50 may provide the value of $t_T$ to control system 25. The control system may then calibrate (50h) the test system to account for and/or eliminate the effects of travel time, $t_T$, along cable 32 during DUT testing.

All or part of the test systems and processes described in this specification and their various modifications may be configured or controlled at least in part by one or more computers such as control system 45 and/or test instruments(s) 43 using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the test system and processes described herein can be performed by one or more programmable processors executing one or more computer programs to control or to perform all or some of the operations described herein. All or part of the test systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

In the description and claims provided herein, the adjectives "first", "second", "third", and the like do not designate priority or order. Instead, these adjectives are used solely to differentiate the nouns that they modify.

Any mechanical or electrical connection herein may include a direct physical connection or an indirect connection that includes intervening components.

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A system comprising:
a signal generator to output signals based on multiple carrier frequencies;
a wired transmission medium for carrying the signals, the wired transmission medium being configured as open ended to produce reflections on the wired transmission medium of the signals; and
a signal analyzer to receive the reflections and to determine a transmission time of a signal along the wired transmission medium based on the reflections, the signal analyzer being configured to perform operations comprising:
performing a coarse search based on the reflections to determine an estimated transmission time, the coarse search to determine which of multiple candidate transmission times to select for the estimated transmission time, the coarse search being insensitive to phase offsets in the reflections; and
performing a fine search based on the estimated transmission time and the reflections to determine the transmission time, the fine search to determine which of multiple candidate transmission times within a range of the estimated transmission time determined by the coarse search to select for the transmission time, the fine search being sensitive to phase offsets in the reflections.

2. The system of claim 1, wherein the the multiple candidate transmission times in the coarse search vary by a first step size;
wherein the fine search comprises a search within the range of the estimated transmission time that is performed using a second step size, the first step size being greater than the second step size; and
wherein the multiple candidate transmission times in the coarse search comprise first candidate transmission times and multiple candidate transmission times in the fine search comprises second candidate transmission times.

3. The system of claim 1, wherein the coarse search is insensitive to magnitude offsets in the reflections.

4. The system of claim 2, wherein the coarse search comprises identifying a maximum correlation based on (i) the first candidate transmission times and (ii) a sum of reflections along the wired transmission medium, reflections at an open end of the wired transmission medium, and noise, the maximum correlation corresponding to the estimated transmission time.

5. The system of claim 1, wherein the fine search is sensitive to magnitude offsets in the reflections; and
wherein at least two of the multiple carrier frequencies are orthogonal.

6. The system of claim 2, wherein the fine search comprises determining the transmission time within the range of the estimated transmission time based on differences between (i) values that are based on the reflections and (ii) values that are based on the second candidate transmission times.

7. The system of claim 6, wherein determining the transmission time comprises identifying one of the values that is based on one of the second candidate transmission times that minimizes a difference of the differences.

8. The system of claim 7, wherein the values based on the reflections are based on magnitudes and phases of the reflections; and
wherein the values that are based on the second candidate transmission times are based on magnitudes and phases of signals having different transmission times.

9. The system of claim 8, wherein the different transmission times vary by single digit picoseconds.

10. The system of claim 1, wherein the range is within a range of 200 picoseconds or more.

11. The system of claim 1, wherein the signal generator and the signal analyzer are part of a single hardware device connected to the wired transmission medium, the single hardware device comprising a tester, the tester comprising one or more processing devices programmed to perform at least the coarse search.

12. The system of claim 1, wherein the multiple carrier frequencies are upconverted based on a direct current (DC) signal; or
wherein the multiple carrier frequencies comprise carrier wave signals not subjected to upconversion.

13. A method comprising:
outputting signals on a wired transmission medium based on multiple carrier frequencies, the wired transmission medium being configured as open ended to produce reflections on the wired transmission medium of the signals; and
determining a transmission time of a signal along the wired transmission medium based on the reflections, wherein determining the transmission time comprises:
performing a coarse search based on the reflections to determine an estimated transmission time, the coarse search to determine which of multiple candidate transmission times to select for the estimated transmission time, the coarse search being insensitive to phase offsets in the reflections; and
performing a fine search based on the estimated transmission time and the reflections to determine the transmission time, the fine search to determine which of multiple candidate transmission times within a range of the estimated transmission time determined by the coarse search to select for the transmission time, the fine search being sensitive to phase offsets in the reflections.

14. The method of claim 13, wherein the multiple candidate transmission times in the coarse search vary by a first step size;

> wherein the fine search comprises a search within the range of the estimated transmission time that is performed using a second step size, the first step size being greater than the second step size; and
>
> wherein the multiple candidate transmission times in the coarse search comprise first candidate transmission times and multiple candidate transmission times in the fine search comprises second candidate transmission times.

15. The method of claim 13, wherein the coarse search is insensitive to magnitude offsets in the reflections.

16. The method of claim 14, wherein the coarse search comprises identifying a maximum correlation based on (i) the first candidate transmission times and (ii) a sum of reflections along the wired transmission medium, reflections at an open end of the wired transmission medium, and noise, the maximum correlation corresponding to the estimated transmission time.

17. The method of claim 13, wherein the fine search is sensitive to magnitude offsets in the reflections; and > wherein at least two of the multiple carrier frequencies are orthogonal.

18. The method of claim 14, wherein the fine search comprises determining the transmission time within the range of the estimated transmission time based on differences between (i) values that are based on the reflections and (ii) values that are based on the second candidate transmission times.

19. The method of claim 18, wherein determining the transmission time comprises identifying one of the values that is a based on one of the second candidate transmission times that minimizes a difference among the differences.

20. The method of claim 19, wherein the values based on the reflections are based on magnitudes and phases of the reflections; and > wherein the values that are based on the second candidate transmission times are based on magnitudes and phases of signals having different transmission times.

21. The method of claim 20, wherein the different transmission times vary by single digit picoseconds.

22. The method of claim 13, wherein the range is within a range of 200 picoseconds or more.

23. The method of claim 13, wherein the multiple carrier frequencies are upconverted based on a direct current (DC) signal; or > wherein the multiple carrier frequencies comprise carrier wave signals not subjected to upconversion.

* * * * *